United States Patent
Falk

(10) Patent No.: US 11,916,903 B2
(45) Date of Patent: Feb. 27, 2024

(54) METHOD FOR SETTING UP AUTHORIZATION VERIFICATION FOR A FIRST DEVICE

(71) Applicant: Siemens Mobility GmbH, Bayern (DE)

(72) Inventor: Rainer Falk, Poing (DE)

(73) Assignee: SIEMENS MOBILITY GMBH, Bayern (DE)

( * ) Notice: Subject to any disclaimer, the term of this patent is extended or adjusted under 35 U.S.C. 154(b) by 383 days.

(21) Appl. No.: 17/259,339

(22) PCT Filed: Jul. 9, 2019

(86) PCT No.: PCT/EP2019/068389
§ 371 (c)(1),
(2) Date: Jan. 11, 2021

(87) PCT Pub. No.: WO2020/011777
PCT Pub. Date: Jan. 16, 2020

(65) Prior Publication Data
US 2021/0297415 A1    Sep. 23, 2021

(30) Foreign Application Priority Data
Jul. 12, 2018   (DE) ............ 10 2018 211 597.4

(51) Int. Cl.
*G06F 7/04*   (2006.01)
*G06F 21/46*  (2013.01)
*H04L 9/40*   (2022.01)

(52) U.S. Cl.
CPC .......... *H04L 63/0876* (2013.01); *G06F 21/46* (2013.01)

(58) Field of Classification Search
CPC . H04L 63/0876; H04L 9/0816; H04L 9/0866; H04L 9/0891; H04L 9/3213;
(Continued)

(56) References Cited

U.S. PATENT DOCUMENTS 7,626,944 B1 *  12/2009  Riddle ................ H04L 41/0806
                                                        370/254
8,990,888 B2    3/2015   Busser et al.
(Continued)

FOREIGN PATENT DOCUMENTS

CN    106161024 A    11/2016
CN    107016275 A     8/2017
(Continued)

OTHER PUBLICATIONS

Chang et al., Secure Intra-Device Communication Protocol between Applications on a Smart Device, IEEE, Dec. 14, 2016, pp. 1-5. (Year: 2016).*

(Continued)

*Primary Examiner* — Philip J Chea
*Assistant Examiner* — Jenise E Jackson
(74) *Attorney, Agent, or Firm* — Schmeiser, Olsen & Watts LLP

(57) ABSTRACT

Provided a method for setting up an authorization verification for a first device, for example a field device in an automation system, wherein the first device is configured by configuration data transmitted to the first device from a configuration module that is detachably connected to the first device and, for example, is implemented in the form of an SD card or a USB stick, having: detection of a connection of a configuration module to the first device, reading configuration module-specific device information from the configuration module, requesting configuration module-specific authorization verification for the configuration model-specific device information from the first device in an authorization device, and storing the requested configuration module-specific authorization verification on a security storage unit of the first device.

19 Claims, 5 Drawing Sheets

(58) Field of Classification Search
CPC ....... H04L 9/3263; G06F 21/46; G06F 21/33; G06F 21/35; G06F 21/44; H04W 12/069; H04W 12/082
See application file for complete search history.

(56) References Cited

U.S. PATENT DOCUMENTS

| | | | |
|---|---|---|---|
| 9,003,190 B2 | 4/2015 | Busser et al. | |
| 10,798,085 B2 | 10/2020 | Falk et al. | |
| 2003/0093642 A1* | 5/2003 | Smith | G06F 12/0661 711/E12.086 |
| 2003/0115154 A1* | 6/2003 | Anderson | G06Q 20/382 705/73 |
| 2003/0120760 A1* | 6/2003 | Fortin | H04L 41/0873 709/221 |
| 2005/0020308 A1* | 1/2005 | Lai | H04W 12/08 455/558 |
| 2005/0075137 A1* | 4/2005 | Reemtsma | H04W 12/35 455/411 |
| 2006/0285693 A1* | 12/2006 | Raikar | H04L 63/062 380/278 |
| 2009/0036126 A1* | 2/2009 | Morikuni | H04W 12/08 455/435.2 |
| 2012/0144189 A1* | 6/2012 | Zhong | H04L 63/0892 713/155 |
| 2014/0161393 A1* | 6/2014 | Borst | H01R 24/00 439/620.22 |
| 2014/0189362 A1* | 7/2014 | Van Den Broeck | H04L 41/0863 713/176 |
| 2017/0111247 A1* | 4/2017 | Uchiyama | G06F 3/1229 |
| 2017/0272257 A1 | 9/2017 | Satoh | |
| 2017/0366537 A1 | 12/2017 | Bose et al. | |
| 2018/0131520 A1 | 5/2018 | Brockhaus et al. | |
| 2018/0160252 A1 | 6/2018 | Olive | |
| 2018/0191505 A1 | 7/2018 | Fradet | |
| 2018/0211021 A1 | 7/2018 | Negi | |
| 2019/0266313 A1* | 8/2019 | Babuscov | G06F 21/64 |
| 2020/0008062 A1* | 1/2020 | Tian | H04W 12/69 |

FOREIGN PATENT DOCUMENTS

| | | |
|---|---|---|
| CN | 107851168 A | 3/2018 |
| DE | 102010033231 A1 | 2/2012 |
| DE | 102010033232 A1 | 2/2012 |
| DE | 102013205051 A1 | 9/2014 |
| DE | 102015213412 A1 | 1/2017 |
| EP | 1380907 A1 | 1/2004 |
| WO | WO 2016198241 A1 | 12/2016 |

OTHER PUBLICATIONS

Harper et al., A Security Policy based Upon Hardware Encryption, IEEE, Jan. 8, 2004, pp. 1-8. (Year: 2004).*

Feng Xue, et al: "Authorized domain based key management model and application for DRM", Application research of computers, vol. 33, No. 3, doi: 10.3969/j.issn.1001-3695.2016.03.051, Sep.6, 2015.

ITU International Telecommunication Union ITU-T Recommendation X.509 (Oct. 2016); https://www.itu.int/rec/T-REC-X.509-201610-I.

PCT International Search Report dated Oct. 7, 2019 corresponding to PCT International Application No. PCT/EP2019/068389 filed Jul. 9, 2019.

* cited by examiner

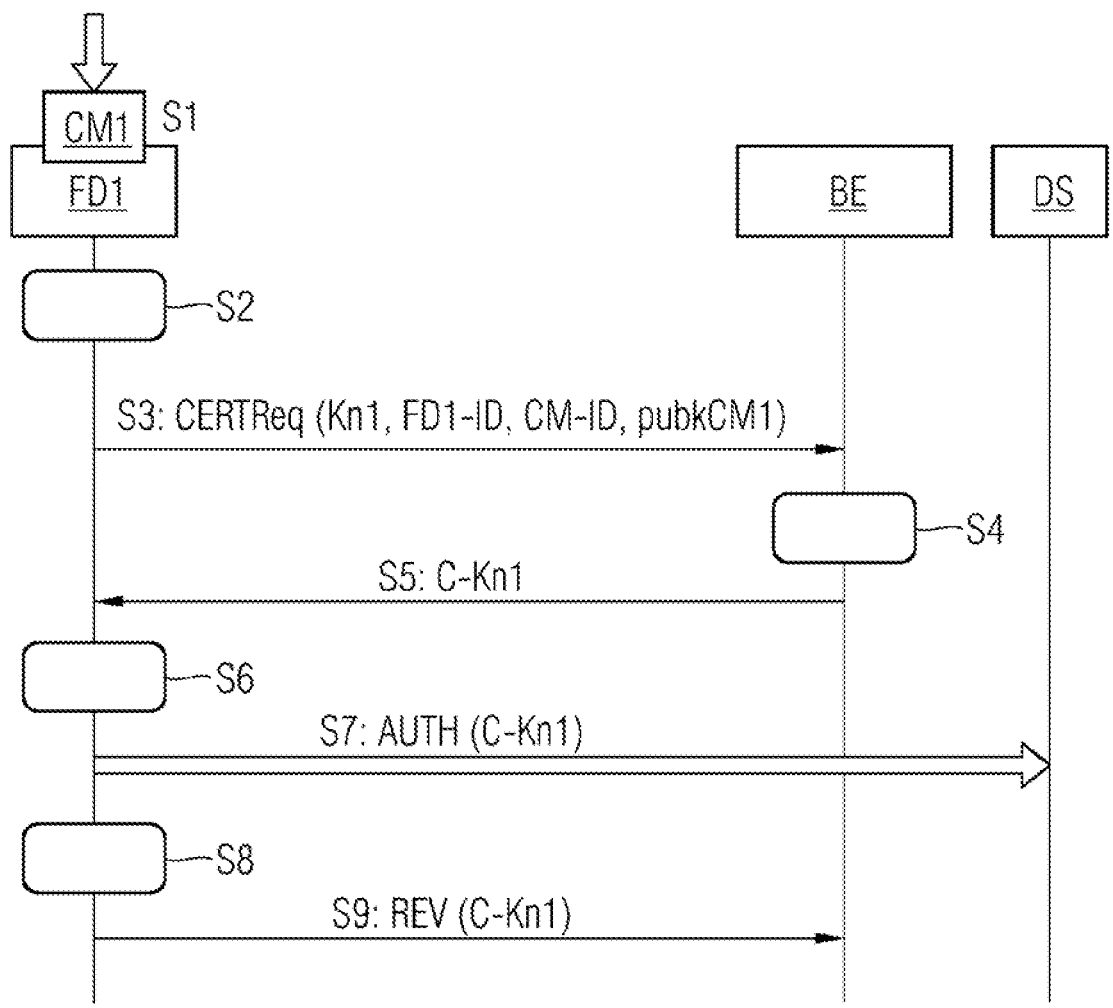

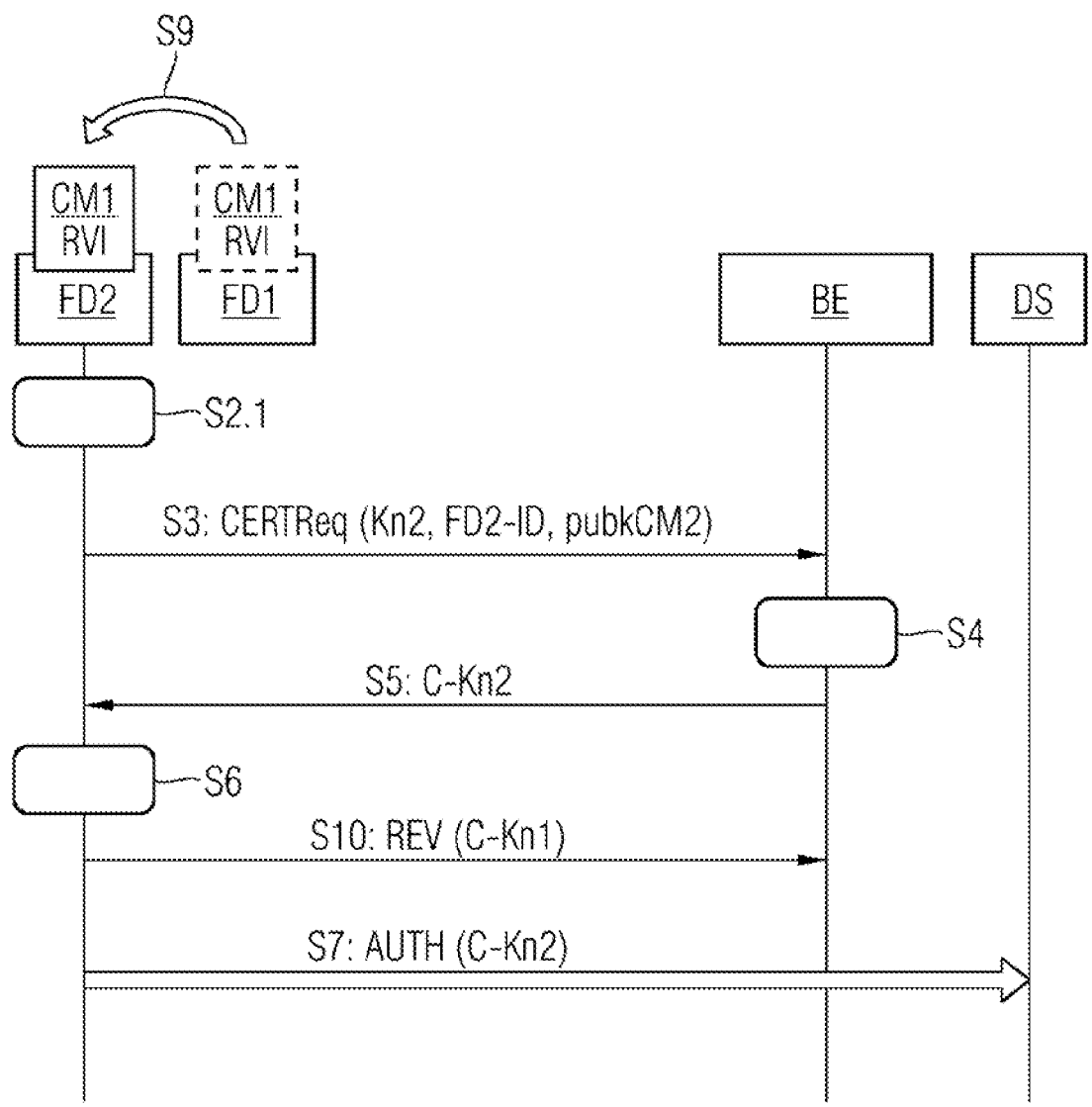

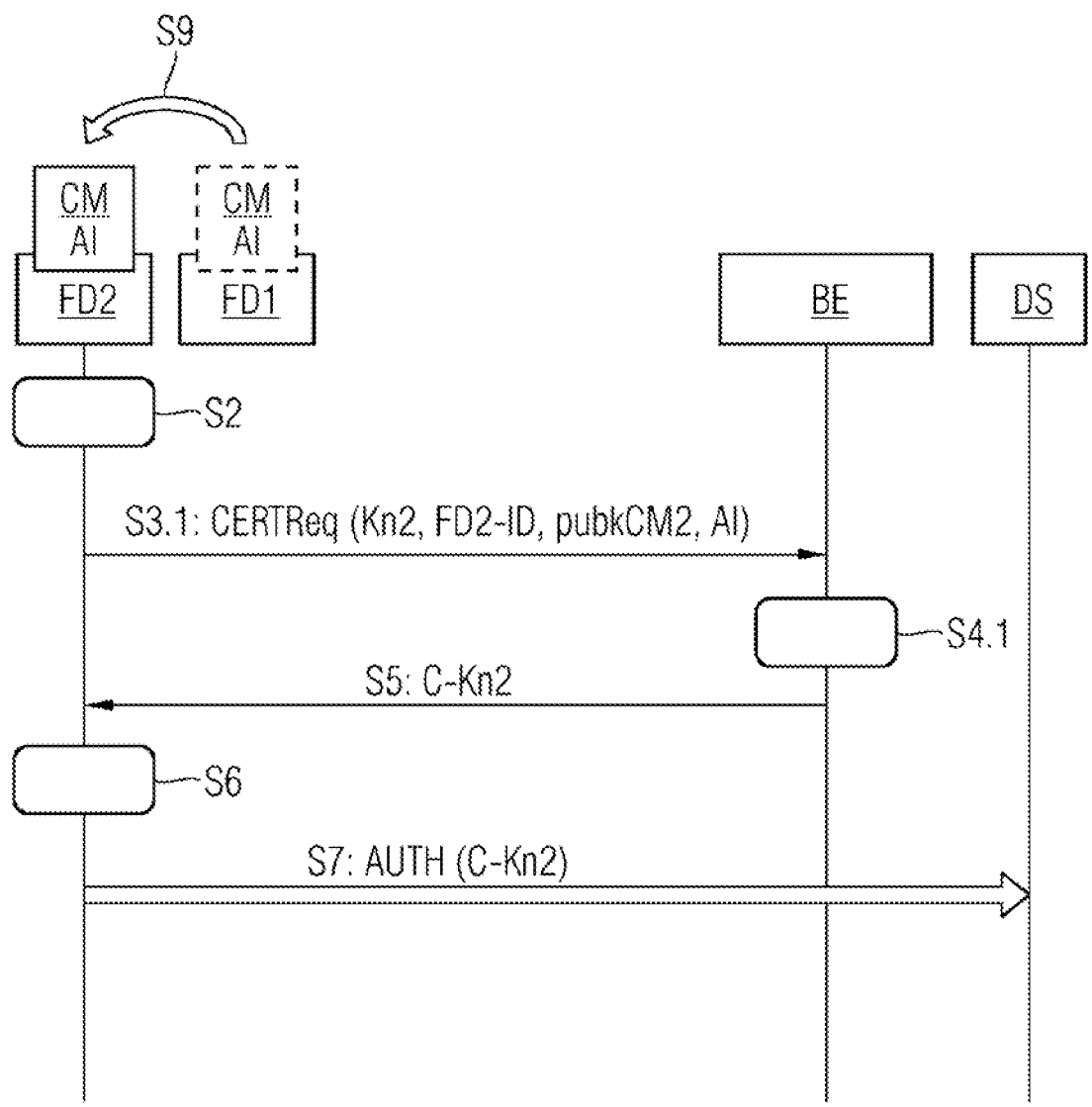

METHOD FOR SETTING UP AUTHORIZATION VERIFICATION FOR A FIRST DEVICE

CROSS-REFERENCE TO RELATED APPLICATIONS

This application claims priority to PCT Application No. PCT/EP2019/068389, having a filing date of Jul. 9, 2019, which is based on German Application No. 10 2018 211 597.4, having a filing date of Jul. 12, 2018, the entire contents both of which are hereby incorporated by reference.

FIELD OF TECHNOLOGY

The following relates to a method for setting up a credential for a first device, wherein the first device is configured by way of configuration data that are transmitted from a configuration module, connected detachably to the first device, to the first device, and to a first device, to a configuration module, to an authorization apparatus and to a computer program product for performing the method.

BACKGROUND

Devices, in particular devices in an Internet of Things, that exchange data with other devices or control apparatuses via communication connections, are used in private networks and in particular also in industrial installations. In order to achieve high availability, in particular in automation installations, it is necessary to be able to quickly exchange defective devices. In this case, a replacement device has to be configured with the same settings. In order to allow fast adoption of a device configuration, it is known to store the configuration data, required for configuring the device, on a storage module, for example on a USB stick, an SD card or C-plug. When a device is exchanged, it is then necessary only to plug such a storage module, which is referred to as configuration module below, of the defective device into a new device. The new device thereby appears as the old device and is therefore also recognized as the old device within the automation network.

From a security point of view, such a device exchange is however insufficient, since it is not possible to distinguish between the old and the new device during operation. Extremely sensitive security configuration data, in particular a device operator certificate and an associated private device key, may also be stored on the configuration module. These sensitive security configuration data are in this case either in plain text or possibly encrypted with a group key that spans devices.

SUMMARY

An aspect relates to a method by way of which devices that are configured via a configuration module, that is to say with the same configuration data, are able to be distinguished between reliably during operation.

According to a first aspect, embodiments of the invention relates to a method for setting up a credential for a first device, wherein the first device is configured by way of configuration data that are transmitted from a configuration module, connected detachably to the first device, to the first device. The method has the following method steps:
  recognizing connection of a configuration module to the first device,
  reading configuration module-specific device information from the configuration module,
  requesting a configuration module-specific credential for the configuration module-specific device information from the first device at an authorization apparatus, and
  storing the configuration-specific credential, requested from the authorization apparatus, on a security storage unit of the first device.

The connection of the configuration module to the first device thus triggers the requesting and allocation of a credential for the device, which takes into consideration the device information stored on the configuration module. By virtue of the configuration module-specific credential being stored on the security storage unit of the first device, the configuration module-specific credential and/or cryptographic key linked thereto are able to be better protected, since a device often has a specific security storage unit or a specific security storage area that has additional security measures. By way of example, reading of the memory may be made more difficult or prevented by tamperproofing measures, or penetration into the security storage unit may be recognized and the data contained therein may be erased.

In one advantageous embodiment, the method comprises a further method step, specifically checking whether a configuration module-specific credential for the configuration-specific device information is already present on the first device and requesting the configuration module-specific credential only when the configuration module-specific credential for the configuration-specific device information is missing on the first device. The check may for example take place when a device is started (booted) and/or when a configuration module is plugged in.

A credential is thus requested only when the connection of a "new configuration module", that is to say a configuration module containing configuration module-specific device information different from the previous configuration module, is recognized. Request messages are thereby able to be reduced and computing capacity of the first device and transmission capacity of a transmission network for the authorization apparatus are thereby able to be saved on or optimized.

In one advantageous embodiment, the configuration module-specific credential is used by the device to authenticate the device to a communication partner.

The configuration module-specific credential itself may be transmitted by the device to the communication partner for authentication. In one variant, depending on the configuration module-specific credential, an authentication parameter may be formed by the device and transmitted to a communication partner for authentication of the device. The authentication parameter may be formed by way of a cryptographic key assigned to the configuration module-specific credential.

Using the configuration module-specific credential, the device is able to authenticate itself as a device configured in accordance with the configuration data of the configuration module and be authenticated by the communication partner. Since the first device requests the configuration module-specific credential, the configuration module-specific credential also contains an identifier of the first device itself. It is thus possible to distinguish between the first device and a second device that is configured with the same configuration module, for example at a different time.

In one advantageous embodiment, the method comprises a further method step, specifically revoking the configuration module-specific credential following disconnection of the configuration module from the first device.

It is thereby ensured that this configuration module-specific credential that was requested by a particular device is no longer recognized as valid following the disconnection of the configuration module from the device. It is thereby ensured that a first device from which the configuration module has been removed is no longer able to authenticate itself using this configuration module-specific credential, which is actually stored on the first device itself and is thus still available to the first device.

In one advantageous embodiment, the configuration module-specific device information is a device identifier stored on the configuration module or a configuration module identifier stored on the configuration module.

A configuration module-specific credential is thus requested in a flexible manner for an identifier that determines the configuration. The stored device identifier may for example be a projected device name for which the configuration is provided. A configuration module identifier may however also be a character string that may be a task range that a correspondingly configured device, for example a control system, executes. Furthermore, by way of example, a checksum, version information, a cryptographic hash value of the device configuration stored on the configuration module may be formed by the first device as configuration module identifier.

In one advantageous embodiment, the configuration module-specific credential is formed as a digital certificate or as an access token in JavaScript Object Notation (JSON).

This has the advantage that such a digital certificate, for example in accordance with the ITU-T standard X.509 or as a JSON token, may be used for authentication in commonly used protocols for setting up a connection.

In one advantageous embodiment, the configuration module-specific credential additionally contains a device-specific device identifier present in the first device.

This has the advantage that there is a link in the credential itself between configuration module-specific device information and the device that transmits the request message. The credential thus unambiguously provides information about the actual device that requests the configuration module-specific credential.

In one advantageous embodiment, an address of the authorization apparatus from which a configuration module-specific credential is requested is stored on the configuration module and is provided from there to the first device.

This has the advantage that the first device is able to transmit a request message, and in particular also a message to revoke the configuration module-specific credential, to the same authorization apparatus. Rapid requesting, but also revocation, of the credential is thereby possible.

In one advantageous embodiment, a request message for requesting the configuration module-specific credential is cryptographically protected by a private configuration key generated by the first device and specific to the configuration module.

The device may thus generate a configuration module-specific key pair, comprising a private configuration key and a public configuration key. This key pair is specific to the combination of device and configuration module. It may therefore be referred to as configuration module-specific device key pair. The public configuration key is in this case contained in the request message. This ensures that the device has the private configuration key that belongs to the public device key contained in the request message.

In one advantageous embodiment, a request message for requesting the configuration module-specific credential is cryptographically protected by a device-specific private key present in the first device.

The device-specific private key and an associated device-specific credential may be a manufacturer key and a manufacturer certificate of the device.

A request message may be protected by the signature of the request message containing one or more of the keys or by forming a cryptographic message authentication message containing one or more of the keys or through transmission via a cryptographically protected communication channel, the setup of which is authenticated by one or more of the keys.

In one advantageous embodiment, when disconnection of the configuration module from the first device is recognized, a revocation request to revoke the configuration module-specific credential is generated by the first device and transmitted to the authorization apparatus.

This has the advantage that the credential is already revoked when the configuration module is disconnected from the first device itself, and is thus no longer accepted as valid by a communication partner.

In one advantageous embodiment, after the configuration module-specific credential has been stored on the first device, revocation information is provided to the configuration module and, when connection of the configuration module to a second device is recognized, depending on the provided revocation information, the revocation of the configuration module-specific credential of the first device is triggered by the second device using the provided revocation information.

This has the advantage that the second device triggers the revocation or transmits a revocation message to the authorization apparatus. This is advantageous in particular when the first device is exchanged due to a defect and is not able to transmit a revocation message when the configuration module is detached from the first device. Since such a revocation message occurs when connection of the configuration module to the second device is recognized, it is ensured that only a configuration-specific credential exists in valid form when a device is actually configured via the configuration module.

In one alternative advantageous embodiment, the second device transmits authorization information dependent on the revocation information with a request message for requesting a configuration module-specific credential for the second device to the authorization apparatus, whereupon the authorization apparatus revokes the configuration module-specific credential of the first device depending on the authorization information.

This has the advantage that it is not necessary for the second device to create and transmit any dedicated revocation message. Revocation of the configuration module-specific credential of the first device may instead be initiated via the request message.

In one advantageous embodiment, the validity duration of the configuration module-specific credential is limited to a predefined number of hours, to one day, and a new configuration module-specific credential is requested by the first device after the validity duration has expired.

This has the advantage that two configuration module-specific credentials for the same configuration module exist at most for a time interval of a validity duration. The validity duration may in this case be adapted to the use of the device and the frequency of a configuration module change and the frequency of set-up communication connections and thus the use of the credential.

Unless stated otherwise in the following description, the terms "recognize connection", "read", "request", "store", "check", "revoke", "assign" and the like refer to operations and/or processes and/or processing steps that change and/or generate data and/or that convert data into other data, data are combined to form messages and transmitted, wherein the data may in particular be represented or be present in the form of physical variables, for example in the form of electrical pulses.

A second aspect of embodiments of the invention relates to a first device that is able to be configured by way of configuration data that are transmitted from a configuration module, connected detachably to the first device, to the first device, having
- a connection unit that is designed to recognize connection of a configuration module to the first device,
- a reading unit that is designed to read configuration-specific device information from the configuration module,
- a control unit that is designed to request a configuration module-specific credential for the configuration-specific device information at an authorization apparatus, and
- a security storage unit that is designed to store the configuration module-specific credential requested from the authorization apparatus.

A "unit" in connection with embodiments of the invention may be understood to mean for example a processor and/or a storage unit for storing program commands or data. A "unit" may for example be implemented in the form of hardware and/or also in the form of software. In the case of an implementation in the form of hardware, the respective unit may be designed as an apparatus or as part of an apparatus, for example as a computer or as a microprocessor or as a control computer. In the case of an implementation in the form of software, the respective unit may be formed as a computer program product (non-transitory computer readable storage medium having instructions, which when executed by a processor, perform actions), as a function, as a routine, as a portion of a program code or as an executable object.

The first device is in this case designed to execute the method described above.

A third aspect of embodiments of the invention relates to a configuration module for configuring a first device, which configuration module is designed to execute the abovementioned method. The configuration module should in particular be considered to be a unit in the form of hardware that is able to be physically disconnected from a first device and connected to a first or second device. The configuration module comprises a storage unit on which the configuration data and information mentioned in the above method may be stored but also read. The configuration module may also be implemented as a unit in the form of software and be able to be loaded for example as a configuration data packet or configuration computer program product onto a device from a computer or server.

A fourth aspect of embodiments of the invention relates to an authorization apparatus for setting up a credential for a first device, wherein the first device is configured by way of configuration data that are transmitted from a configuration module, connected detachably to a first device, to the first device, which authorization apparatus is designed to execute the described method.

In a fifth aspect, embodiments of the invention relates to a computer program product that is able to be loaded directly into a memory of a digital computer, comprising program code portions that are suitable for performing the steps of the described method.

A computer program product, such as for example a computer program means, may be provided or supplied for example as a storage medium, such as for example a memory card, a USB stick, a CD-ROM, a DVD or else in the form of a downloadable file from a server in a network.

BRIEF DESCRIPTION

Some of the embodiments will be described in detail, with references to the following Figures, wherein like designations denote like members, wherein:

FIG. 2A shows a first exemplary embodiment of the method in the form of a flowchart;

FIG. 2B shows a second exemplary embodiment of the method with a further revocation variant of the configuration module-specific credential in the form of a message flowchart;

FIG. 2C shows a third exemplary embodiment of the method with a further revocation variant of the configuration module-specific credential in the form of a message flowchart;

DETAILED DESCRIPTION

Figure 1:
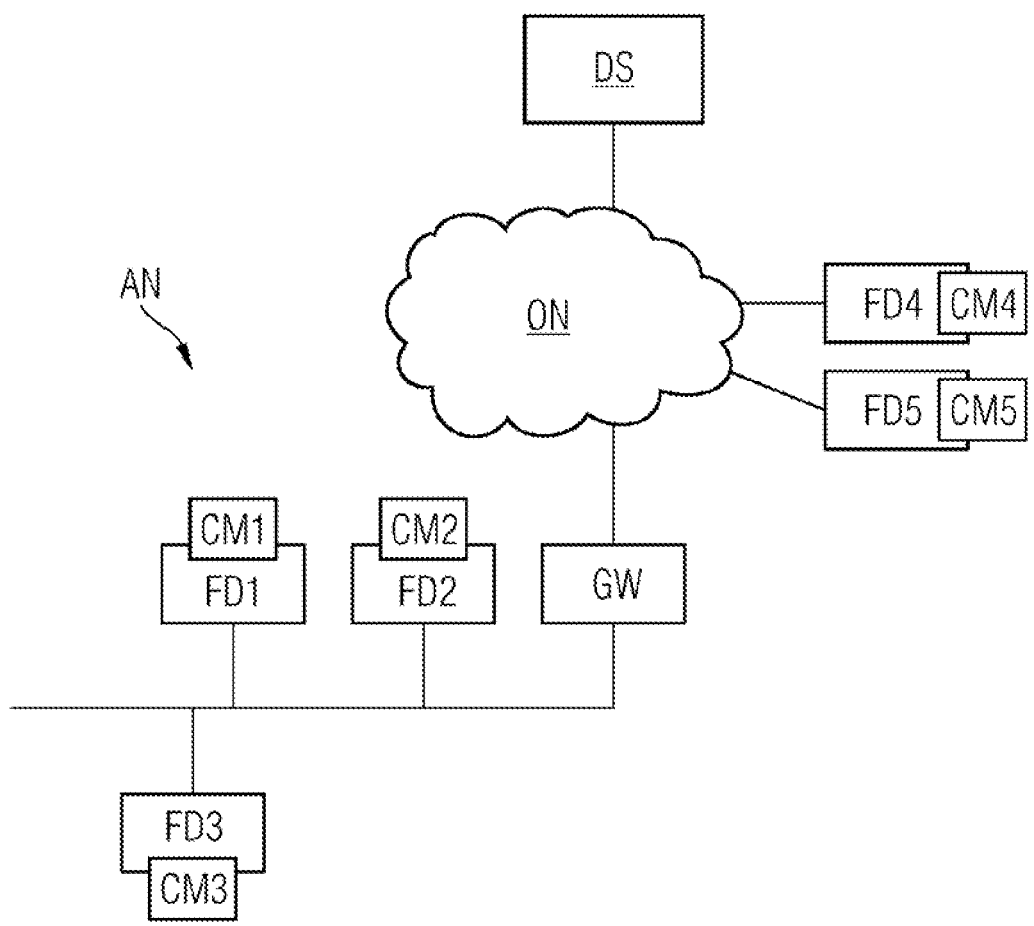
FIG. 1 shows an application scenario for the method, with an exemplary embodiment of the authorization apparatus and first devices in a schematic illustration.

FIG. 1 shows, as application scenario for the method according to embodiments of the invention, a communication network AN, for example an automation installation, containing a plurality of devices FD1, FD2, FD3, FD4, FD5 and a gateway GW that are connected to a service server DS via a public network ON. The devices FD1, FD2, FD3, FD4, FD5 are connected in each case to a configuration module CM1, CM2, CM3, CM4, CM5 on which the current configuration data of the respective device FD1, FD2, FD3, FD4, FD5 are stored in order to be able to replace the device FD1, FD2, FD3, FD4, FD5 easily with a replacement device in the event of a defect. A replacement device does not have to be configured explicitly, but rather it is sufficient to withdraw the configuration module from the defective device and to insert it into the new device.

The core concept of embodiments of the invention is then that, after connection of a configuration module to a device is recognized, the device requests and receives a configuration module-specific credential, for example a device certificate or a JSON token, by virtue of configuration module-specific device information, specified in the configuration module, being contained as device name and being defined by the configuration module currently connected to the device. The device FD1 recognizes the connection of the configuration module CM1 to the device FD1, for example by virtue of the configuration module CM1 having been plugged into the first device FD1, that is to say electrical contact having been created between the configuration module CM1 and the first device FD1 and data being transmitted in the form of electrical signals.

FIG. 2A shows the method in the form of a message flowchart. In a first method step S1, the first device FD1 recognizes that the configuration module CM1 has been connected to a first device FD1. In method step S2, the device FD1 reads at least one item of configuration module-specific device information Kn1 from the configuration module CM1.

After reading the configuration module-specific device information Kn1, the first device FD1 generates for example a new configuration key pair comprising a public configuration key pubkCM1 and an associated private configuration key privkCM1, corresponding to a public key infrastructure (PKI). The first device forms a certificate request message CERTReq that comprises the generated public key pubkCM1, configuration module-specific device information Kn1, and a device identifier FD1-ID contained in the first device FD1. The configuration module-specific device information Kn1 is for example a device identifier Gn stored on the configuration module, in particular a projected device name. The configuration module-specific device information Kn1 may also be a configuration module identifier KDI stored on the configuration module CM1.

In one variant, identification information of the configuration module CM-ID is additionally inserted into the certificate request message CERTReq. The identification information of the configuration module CM-ID may be for example a serial number of the configuration module and/or be identification information that identifies the configuration data stored on the configuration module, for example a hash value or version information of the configuration data.

The certificate request message CERTReq may be multiply cryptographically protected. On the one hand, the request message CERTReq is signed with the private configuration key privkCM1 that was generated when the configuration module was connected to the first device. It is thereby possible to check whether the transmitting device FD1 actually has the private key privkCM1. The request message CERTReq may furthermore be digitally signed with a device-specific private device key privkFD1 present in the first device and to which a device-specific credential C-FD1 is assigned. This device-specific credential C-FD1 present in the device may be for example a manufacturer certificate of the first device FD1, the device-specific private device key privkFD1 or a private manufacturer key. The device by which the request message CERTReq is created is thereby able to be unambiguously checked.

It is furthermore possible for the certificate request message CERTReq to be additionally signed with a private key of the configuration module. To this end, a private configuration module authentication key privkCMS is stored on the configuration module CM, see FIG. 3. In one variant, the configuration module CM has a security element CM-SE in order to form a digital signature by way of the private configuration module authentication key privkCMS stored on the configuration module CM. The first device FD1 transmits a signature request, depending on the formed certificate request message, to the configuration module CM. The configuration module provides the formed digital signature to the first device FD1. In another variant, the private configuration module authentication key privkCMS1 is able to be read by the first device FD1 from the configuration module CM1, such that the first device FD1 itself is able to form the signature.

The signed request message CERTReq is then transmitted, together for example with registration authorization information of the configuration module CM, to the authorization apparatus BE. The registration authorization information may be read by the first device FD1 from the configuration module CM (for example a password, a PIN code, a JSON web token). The authorization apparatus BE checks the request message, see S4, and issues the configuration-specific credential C-Kn, in accordance with the request message CERTReq, and provides the configuration module-specific credential C-Kn1, for example in the form of a digital certificate, to the first device FD1, see S5.

The first device FD1 stores the issued configuration module-specific credential C-Kn1, see S6, and may then use the configuration module-specific credential C-Kn1 to authenticate itself to other devices FD2, FD3, FD4, FD5, the gateway GW or a service server DS, see S7.

If the configuration module CM1 is disconnected from the first device FD1, see S8, then a revocation message REV to revoke the configuration module-specific credential C-Kn1 is transmitted to the authorization apparatus BE by the first device FD1, see S9. The authorization apparatus BE thereupon revokes the configuration module-specific credential C-Kn1.

In addition or as an alternative to the above-described revocation of the configuration module-specific credential C-Kn1, the first device FD1 may provide revocation information RVI that identifies the configuration module-specific credential C-Kn1 of the first device FD1 to the configuration module CM1. This means that this revocation information RVI is stored on the configuration module CM1. This may be performed for example in method step S6.

FIG. 2B now illustrates the message flow when the configuration module CM1 is switched, for example from the first device FD1 to a second device FD2.

When the configuration module CM1 is switched for example from the first device FD1 to a second device FD2, after the configuration module CM1 is connected to the second device FD2, see S9, the configuration data and the revocation information RVI are provided by the configuration module CM1 to the second device FD2 and received there, see method step S2.1. The second device FD2 requests a new configuration module-specific credential C-Kn2 at the authorization apparatus BE in accordance with the method steps S3, S4, S5 illustrated and described in FIG. 2A and stores it in the second device FD1, see S6.

The second device FD2 may then use the revocation information RVI to revoke a revocation message REV to the authorization apparatus BE, which is likewise identified by information from the configuration module CM1, see S10. The configuration module-specific credential C-Kn1, which was issued for the first device FD1, is then revoked and is thus no longer valid. Method step S10 may also be executed at an earlier time, for example prior to the request for a new configuration module-specific credential, see method step S3, or prior to the transmission of the configuration module-specific credential for the second device FD2, see method step S5. The second device FD2 then authenticates itself by way of the configuration module-specific credential C-Kn2, see S7.

FIG. 2C now shows a further variant for the revocation of the configuration module-specific credential C-Kn1 after the configuration module CM1 is switched from the first device FD1 to a second device FD2, see method step S9.

When the configuration module CM1 is read, see S2, authorization information AI that authorizes revocation of the configuration module-specific credential C-Kn1 that was issued for the first device FD1 is additionally read. The authorization information AI is transmitted to the authorization apparatus BE in the request message CERTReq for requesting a new configuration module-specific credential C-Kn2 for the second device FD2, see S3.1. The authorization apparatus BE identifies the credential C-Kn1 to be revoked of the first device FD1 on the basis of the authorization information AI and revokes it independently, see method step S4.1. The authorization apparatus BE furthermore transmits the requested configuration module-specific credential C-Kn2 for the second device FD2 in the manner already described, see method step S5.

In this exemplary embodiment, there is thus also just one valid configuration module-specific credential. The second device FD2 then authenticates itself by way of the configuration module-specific credential C-Kn2, see S7.

Figure 3:
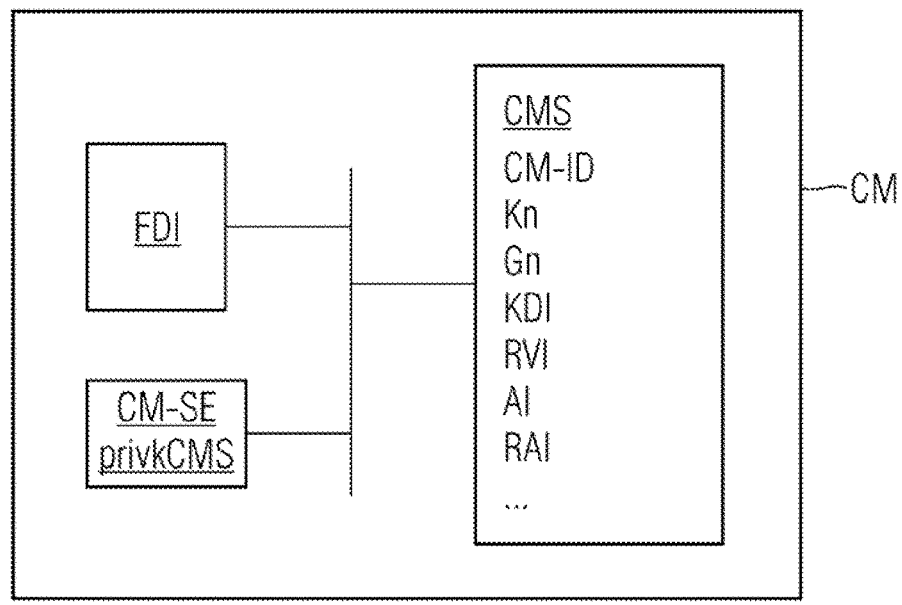
FIG. 3 shows an exemplary embodiment of a configuration module in a block illustration.

FIG. 3 now describes an exemplary embodiment of a configuration module CM. The configuration module CM comprises an interface FDI for connecting the configuration module to a device FD. The device interface FDI is connected to a memory CMS. The memory ensures both read and write access through the device interface FDI. The memory CMS may be designed for example as a memory chip. The memory CMS stores information, for example a configuration module identifier CM-ID, configuration module-specific device information Kn, a device identifier Gn, a configuration module identifier KDI, revocation information RVI, authorization information AI, registration authorization information RAI, and also further configuration data for a device. The device identifier Gn is a projected device name.

In one variant, the configuration module CM has a security element CM-SE in order to form a digital signature by way of the private configuration module authentication key privkCMS stored on the configuration module CM. The configuration module authentication key privkCMS is stored on the security element CM-SE.

Figure 4:
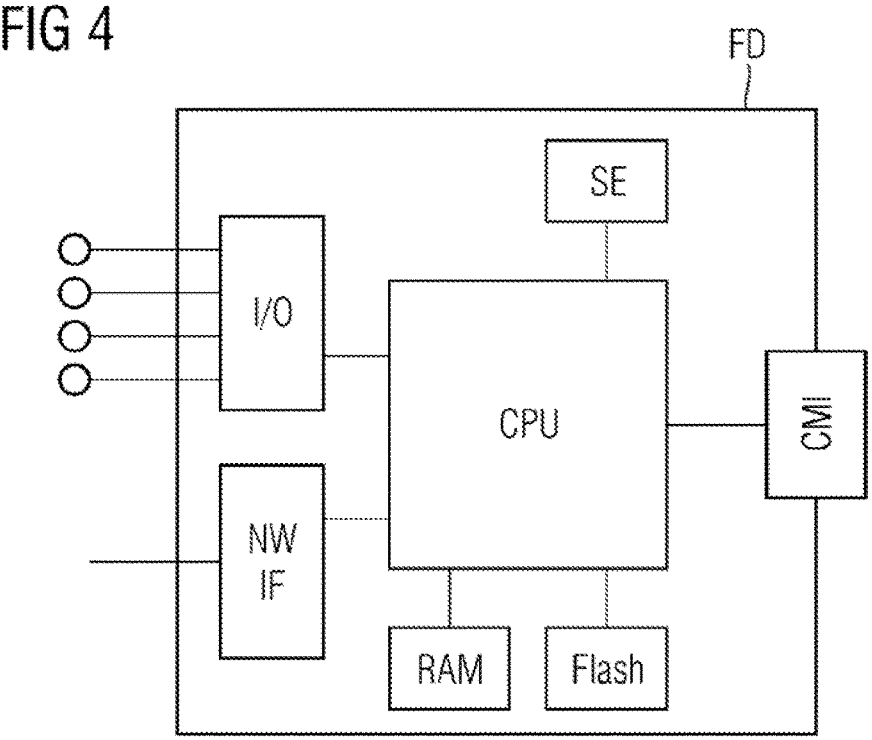
FIG. 4 shows an exemplary embodiment of a first device in a block illustration.

FIG. 4 illustrates a device FD, for example the first or second device FD1, FD2. The device FD has a control unit CPU that is designed as a microprocessor, a memory RAM, a network interface NWIF, an input/output interface I/O for the connection of for example sensors and actuators, a configuration module interface CMI and a security storage element SE.

The configuration module CM comprises configuration data comprising in particular a projectable device name, Gn-ID, for example a predefinable character string. The configuration data furthermore comprise registration authorization information, for example a registration code, or a JSON web token.

The security storage element SE is designed for example to securely store cryptographic keys and to perform cryptographic operations. The security storage element SE may be designed as a separate hardware security module or as an integrated secure element, a "system on chip", in which a protected security area is also provided in addition to the control unit. Such a security area on a "system on chip" may be for example a trusted execution environment (TEE), a hardware crypto engine, a security guard extension SGX or an integrated trusted platform module TPM. In a further variant, a "system on chip" may have a secure memory area that is formed for example by specific physical protection layers such that it is not able to be read or manipulated easily even when the chip housing is open. Tamper sensors, for example for monitoring supply voltage, temperature or clock signals, and penetration sensors such as light sensors, radiation sensors, proximity sensors or a wire-mesh sensor may furthermore be provided.

The security storage element SE stores the configuration module-specific credential C-Kn, for example a device certificate and an associated private key by way of which the device FD is able to authenticate itself. The configuration module-specific credential C-Kn comprises a fixed device-specific identifier FD1-ID of the first device FD1, for example a serial number, a manufacturer of the device, device type information or a version of the device. In this case, one or more of these items of information may be contained in the device-specific credential and/or in a configuration module-specific credential C-Kn of the device.

The control unit CPU recognizes when a configuration module CM is connected to the device FD, that is to say is plugged in or switched. The control unit CPU reads the stored configuration information from the configuration module CM in order to perform control and monitoring tasks depending thereon. These may be for example parameters for controlling the proportional component, parameters for integrators, differentiators or even projection data for a programmable logic controller.

The security storage element SE or the control unit CPU of the device FD is designed, during the reading or after the reading of the information stored on the configuration module, to generate a new configuration key pair and to generate a request message, for example for a digital certificate as credential C-Kn. The request message comprises the generated public key pubkCM, the device-specific device identifier FD1-ID and the configuration-specific device information, in particular the projected device name Gn-ID.

A first device FD1 is thus able to securely internally store keys and the configuration module-specific credential C-Kn for the device authentication. The device FD is nevertheless able to be exchanged easily by virtue of the configuration module CM1 being plugged into a new, second device FD1.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for setting up a credential for a first device, wherein the first device is configured by way of configuration data that are transmitted from a configuration module to the first device, the configuration module connected detachably to the first device, and the method comprising:
   recognizing connection of the configuration module to the first device;
   reading configuration module-specific device information from the configuration module;
   requesting a configuration module-specific credential for the configuration module-specific device information from the first device, by way of a request message that is cryptographically protected by a key generated by the configuration module and a key generated by the first device, at an authorization apparatus; and
   storing the requested configuration module-specific credential on a security storage unit of the first device;
   wherein the request message is a certificate request message that includes the generated public configuration key, the configuration module device identifier, and a device identifier stored in the first device, and the public configuration key and a private configuration key is generated by the first device.

2. The method as claimed in claim 1, further comprising:
   checking whether a configuration module-specific credential for the configuration module-specific device information is already present on the first device; and requesting the configuration module-specific credential only when the configuration module-specific credential for the configuration module-specific device information is missing on the first device.

3. The method as claimed in claim 1, wherein the configuration module-specific credential is used by the first device to authenticate the device to a communication partner.

4. The method as claimed in claim 3, wherein, when disconnection of the configuration module from the first device is recognized, a revocation request to revoke the configuration module-specific credential is generated by the first device and transmitted to the authorization apparatus.

5. The method as claimed in claim 3, whereinafter the configuration module-specific credential has been stored on the first device, revocation information is provided to the configuration module and, when the configuration module is connected to a second device, depending on the provided revocation information, the revocation of the configuration module-specific credential of the first device is triggered by the second device using the provided revocation information.

6. The method as claimed in claim 5, wherein the second device transmits authorization information dependent on the revocation information and containing a request message for requesting a configuration module-specific credential for the second device to the authorization apparatus, and the authorization apparatus revokes the configuration module-specific credential of the first device depending on the authorization information.

7. The method as claimed in claim 3, wherein the validity duration of the configuration module-specific credential is limited to a number of hours, to one day, and a new configuration module-specific credential is requested by the first device after the validity duration has expired.

8. The method as claimed in claim 1, further comprising:
revoking the configuration module-specific credential following disconnection of the configuration module from the first device.

9. The method as claimed in claim 1, wherein the configuration module-specific device information is a device identifier stored on the configuration module or a configuration module identifier stored on the configuration module.

10. The method as claimed in claim 1, wherein the configuration module-specific credential is formed as a digital certificate or as an access token in JavaScript Object Notation.

11. The method as claimed in claim 1, wherein the configuration module-specific credential additionally contains a device-specific device identifier present in the first device.

12. The method as claimed in claim 1, wherein an address of the authorization apparatus from which a configuration module-specific credential is requested is stored on the configuration module and is provided from there to the first device.

13. The method as claimed in claim 1, wherein the key generated by the first device is a private configuration key, and wherein the key is specific to the configuration module.

14. The method as claimed in claim 13, wherein the key generated by the configuration module is a device-specific private key present in the configuration module.

15. A configuration module for configuring the first device, wherein the configuration module comprises a microprocessor configured to execute the method as claimed in claim 1.

16. An authorization apparatus for setting up a credential for the first device, wherein the authorization apparatus comprises a control computer, and wherein the first device is configured by way of configuration data that are transmitted from a configuration module, connected detachably to the first device, to the first device, which control computer is designed to execute the method as claimed in claim 1.

17. A computer program product, comprising a computer readable hardware storage device having computer readable program code stored therein, said program code executable by a processor of a computer system to implement the method as claimed in claim 1.

18. A first device that is able to be configured by way of configuration data that are transmitted from a configuration module to the first device, the configuration module connected detachably to the first device, and the first device comprising:
at least one processor coupled to a memory, the processor configured to:
recognize connection of a configuration module to the first device;
read configuration module-specific device information from the configuration module;
request a configuration module-specific credential for the configuration module-specific device information, by way of a request message that is cryptographically protected by a key generated by the configuration module and a key generated by the first device, at an authorization apparatus; and
store the configuration module-specific credential requested from the authorization apparatus;
wherein the request message is a certificate request message that includes the generated public configuration key, the configuration module device identifier, and a device identifier stored in the first device, and the public configuration key and a private configuration key is generated by the first device.

19. The first device as claimed in claim 18, wherein the first device is designed to execute a method for setting up a credential for the first device.

* * * * *